United States Patent
Chen et al.

(10) Patent No.: US 10,408,589 B1
(45) Date of Patent: Sep. 10, 2019

(54) FABRICATING EMBEDDED FRAGMENTATION CASES FOR ANTI-PERSONNEL MINES

(71) Applicant: U.S. Government as Represented by the Secretary of the Army, Picatinny Arsenal, Dover, NJ (US)

(72) Inventors: Yao Chen, Brooklyn, NY (US); John Osterndorf, Denville, NJ (US); Dennis Kong, Parsippany, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 189 days.

(21) Appl. No.: 15/709,881

(22) Filed: Sep. 20, 2017

(51) Int. Cl.
| | |
|---|---|
| F42B 12/00 | (2006.01) |
| F42B 23/00 | (2006.01) |
| F42B 33/00 | (2006.01) |
| B32B 38/00 | (2006.01) |
| F42B 12/32 | (2006.01) |
| F42B 23/14 | (2006.01) |

(52) U.S. Cl.
CPC .............. *F42B 12/32* (2013.01); *F42B 23/14* (2013.01); *F42B 33/001* (2013.01); *B32B 38/0004* (2013.01); *Y10T 156/1002* (2015.01); *Y10T 156/109* (2015.01); *Y10T 156/1062* (2015.01); *Y10T 156/1085* (2015.01); *Y10T 156/1092* (2015.01); *Y10T 156/1093* (2015.01); *Y10T 156/1322* (2015.01); *Y10T 156/1751* (2015.01)

(58) Field of Classification Search
None
See application file for complete search history.

(56) References Cited

U.S. PATENT DOCUMENTS

| | | | | |
|---|---|---|---|---|
| 2,972,949 | A * | 2/1961 | MacLeod | F42B 12/32 102/401 |
| 3,298,308 | A * | 1/1967 | Throner, Jr. | F42B 12/32 102/496 |

* cited by examiner

*Primary Examiner* — Linda L Gray
(74) *Attorney, Agent, or Firm* — Michael C. Sachs

(57) ABSTRACT

A method of permanently affixing tungsten cube fragments to the fragmentation warhead in a convex Claymore mine having a plastic case and a housing. Pieces of predetermined sized structural film adhesive are positioned at temperature 60° F.±5° F., then pressed into the plastic case while pouring tungsten cubes into the case. The cubes are arranged into desired patterns all at temperature 70° F.±2° F. An interface plate and 5 lbs of weight are then placed atop thereof and all are heated in an oven at temperature 205° F.±5° F. for four hours for full cure of a desired product.

9 Claims, 2 Drawing Sheets

FABRICATING EMBEDDED FRAGMENTATION CASES FOR ANTI-PERSONNEL MINES

U.S. GOVERNMENT INTEREST

The inventions described herein may be made, used, or licensed by or for the U.S. Government for U.S. Government purposes.

BACKGROUND OF INVENTION

This invention relates to improved manufacture of fragmenting warheads for land mines and for warheads of other fragmenting type munitions (FCAP). It deals particularly with methods of positioning and permanently affixing required multiple fragments in place into a warhead, which steps are integral to manufacture of such warheads.

The M18A1 Tactical Claymore mine in use is a directional anti-personnel mine and area denial system. It is used to prevent enemies from entering a critical location and to control various zones through launching multiple lethal fragment projectiles thereat. An M18A1 consists of a plastic case housing with a curved layer of fragments during storage, leading up to usage in theater by propelling such fragments at a target. This mold and two (2) part epoxy potting process may be thought of as the traditional method of manufacturing the embedded fragments of an M18A1 claymore mine.

A new curve design to optimize the lethality of the claymore while reducing the physical size of the M18A1 was desired, but this effort would require repetitive multiple iterations of prototypes after each live fire testing. Prototypes of different curve design iterations would therefore have required many tooling molds to be fabricated, at the very least. The cost and scheduling to produce such multiple molds are a great hurdle. Since the conventional methods of binding the patterned fragments onto prototype claymores are not practical for such repetitive testing, if not even generally for standard serialized manufacturing of landmines, new solutions had to be explored.

The conventional binding method is unnecessarily heavy because of excess epoxy. It may be also coincidentally be less efficient in lethality because of unnecessary energy loss in breaking up the excessive epoxy binder between the fragments. The conventional methods of manufacturing would be to first arrange and encase steel balls into a mold, and then to pour a two part liquid epoxy as the binder. Since the steel balls have to be positioned in a specific pattern, the adhesive/binder cannot be applied before the arrangement of the steel balls; adhesive would necessarily have to be applied after the pattern is formed. Further, the conventional methods add unnecessary weight to the user and require more energy to break up the excessive epoxy binder. As mentioned, it also is too costly to develop multiple case iteration design for live firing because a new mold fabrication would be required for each iteration/concept.

The invention describes a method of binding the tungsten fragment cubes in a specific pattern onto the plastic case without costly mold fabrication. The binding process needs to be easily processed and conforms to all new case iteration concepts. The shear strength of the binder must be durable, but still low enough strength to where it does not impede launching of the projectiles.

BRIEF DESCRIPTION OF THE INVENTION

The invention utilizes a structural film adhesive that is easily formable at room temperature where it allows cube fragments to be easily arranged into a specific pattern prior to cure. It conforms to all new designs and does not clump the tungsten cubes together upon detonation.

The invention takes advantage of differentials in tack level of the structural film adhesive when subjected to different temperatures. Structural film adhesive is sensitive to temperature and is tack free when subjected to less than 70° F. A tack free condition allows for the tungsten cubes to be arranged to their proper location which would allow maximum control of lethality and spray pattern of the fragmentation case.

DETAILED DESCRIPTION OF THE INVENTION

FIG. 2 shows a Claymore type mine. It may have folding legs 203, and has a curved front wall 201 held in a case 209. It may be initiated by a blasting cap 205 plugged into a well 207. There may be sights 211 and 213 to aim in positioning. FIG. 3 shows a partial side view of another Claymore type mine, meant to show that the claymore wall 301 that is needed is curved, and that fragments 303 must be affixed to the wall. Also, there is a high explosive 319 within the case 309 used to detonate the mine. The mine may be supported by folding legs 305. Initiation of the explosive causes a spraying of fragments over a wide area, aimed at a target. Producing the Claymore type mine under discussion requires production of a Claymore type body 106 (see FIG. 1) and to which are affixed tungsten cubes 105 as fragments. Positioning and maintaining the location of these multiple cubes is a great challenge, which is solved by this invention. The fragments may be made to comprise a combination of balls and cubes.

A structural adhesive tape which may be used in this invention is product named AF 163-2M with 0.060 WT (weight), color RED, by 3M Company. Ply of structural adhesive can be easily cut into the correct size between 60° F.±5° F. to allow for different concept iterations to be prototyped without costly molds. Current methods in this invention utilize an interface plate and weight to keep constant pressure during curing. However, it is conceivable that the interface plate and weight can be replaced with an autoclave or pressure oven. It is noted that light pressure needs to be applied to surface areas being bonded.

The structural adhesive illustrated in FIG. 1 is thin and only weighs 5 grams total with each sheet being 2.5 grams. It provides good structural integrity for the cubes with minimum impedance at detonation, allowing the projectiles to launch individually. Live fire testing verified the lethality of this new antipersonnel fragmentation case (FCAP).

The manufacturing process involves the following steps with their specific processing temperatures.

In a first step, one would cut out two (2) (104) pieces of predetermined width and length from the structural film adhesive at temperature being then 60° F.±5° F. The following steps 2-6 are all conducted at temperature being 70° F.±2° F. In the second step, one would position and press the film adhesive into the plastic case. In the third step, one would then pour the desired tungsten cubes (105) into the case. In the fourth step, one would then arrange the cubes into the desired pattern while in the case. In the fifth step, one would press the film adhesive into the patterned cubes. In the sixth step, one would press the sheet metal (103) into the film adhesive. In the seventh step, one would place the interface plate (102) and 5 lb of weight (101) onto the top of sheet metal, then cure in an oven at temperatures of 205° F.±5° F., for four hours. It can be seen that step 7 involves time and pressure to allow for full cure of the adhesive, without deforming or degrading of the plastic housing. In the result, one has permanently attached tungsten cubes to the plastic case, exactly in a desired pattern, and without the use of epoxy potting or costly and time consuming tooling molds, e.g., as previously needed. These can be used to produce embedded tungsten tiles for fragmentation for various claymore curvatures, geometries and sizes. And, the physical size of the claymore may be reduced while optimizing its lethality nonetheless. In live fire testings, a claymore made by this invention was successfully tested at a 35 meters range showing adequate lethality patterns on witness plates.

OBJECTS OF THE INVENTION

Accordingly, it is an object of the present invention to provide means for fabricating a Claymore mine type matrix without the use of epoxy potting or costly, time consuming tooling molds for instance, according to this invention.

Another object of the present invention is to provide means for permanently affixing fragments into a Claymore mine type matrix.

It is a further object of the present invention to utilize structural film adhesive in the process of fabricating a Claymore type mine to aid in permanently affixing tungsten cubes exactly in a desired pattern according to this invention.

These and other objects, features and advantages of the invention will become more apparent in view of the within detailed descriptions of the invention, the claims, and in light of the following drawings wherein reference numerals may be reused where appropriate to indicate a correspondence between the referenced items. It should be understood that the sizes and shapes of the different components in the figures may not be in exact proportion and are shown here just for visual clarity and for purposes of explanation. It is also to be understood that the specific embodiments of the present invention that have been described herein are merely illustrative of certain applications of the principles of the present invention. It should further be understood that the geometry, compositions, values, and dimensions of the components described herein can be modified within the scope of the invention and are not generally intended to be exclusive. Numerous other modifications can be made when implementing the invention for a particular environment, without departing from the spirit and scope of the invention.

LIST OF FIGURES

DETAILED DESCRIPTION OF THE INVENTION

Figure 1:
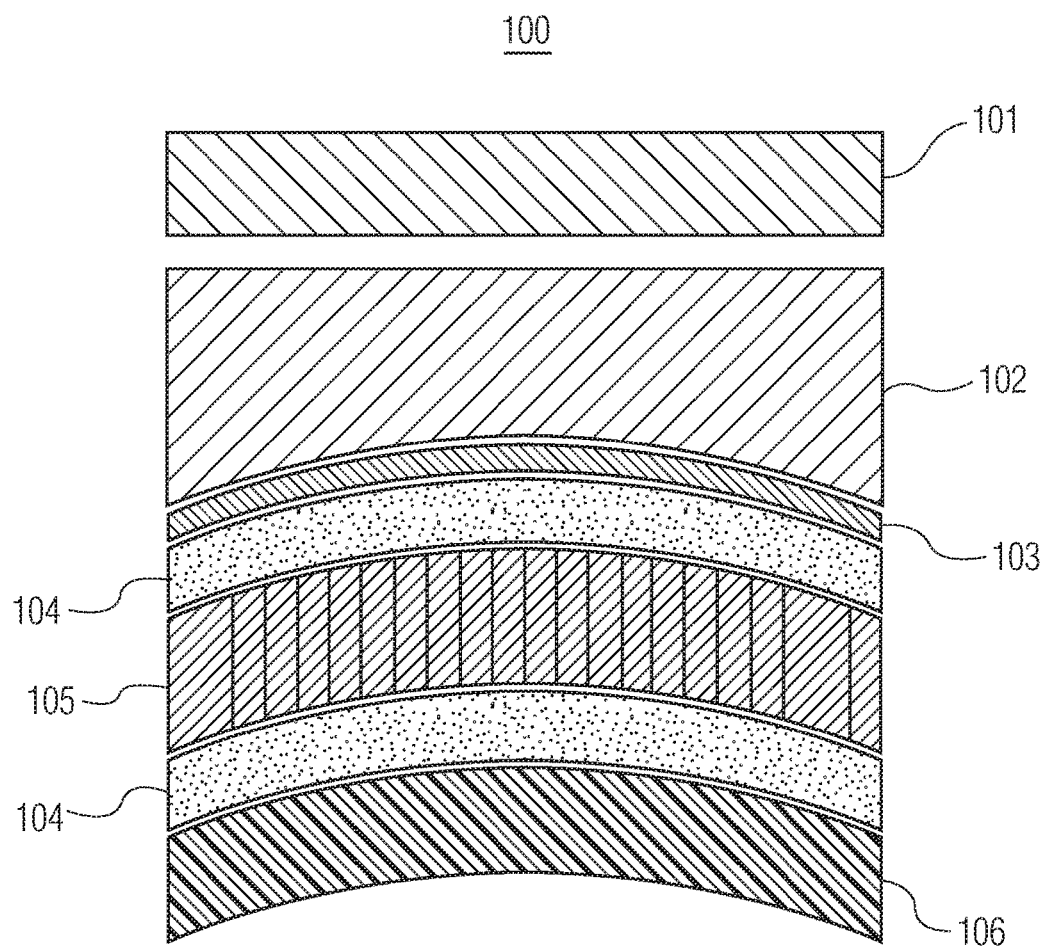
FIG. 1 illustrates the steps used in permanently affixing fragments 105 to a Claymore mine type matrix 106 during the process of fabricating same.
Figure 2:
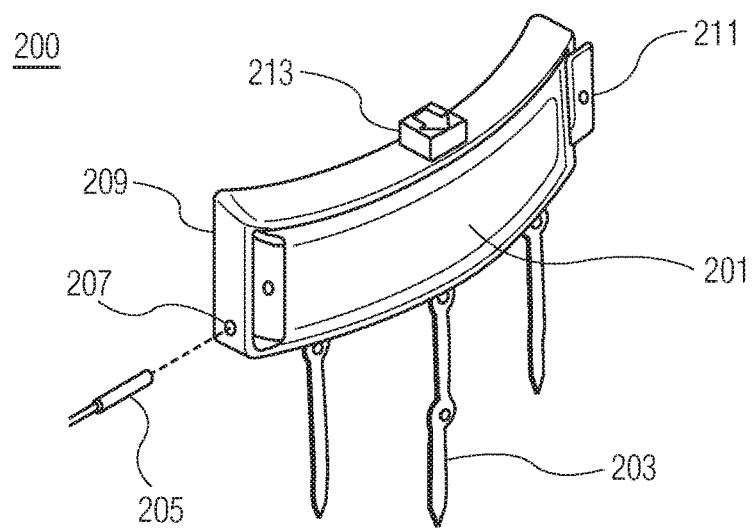
FIG. 2 illustrates the outward appearance of a Claymore type mine 200.
Figure 3:
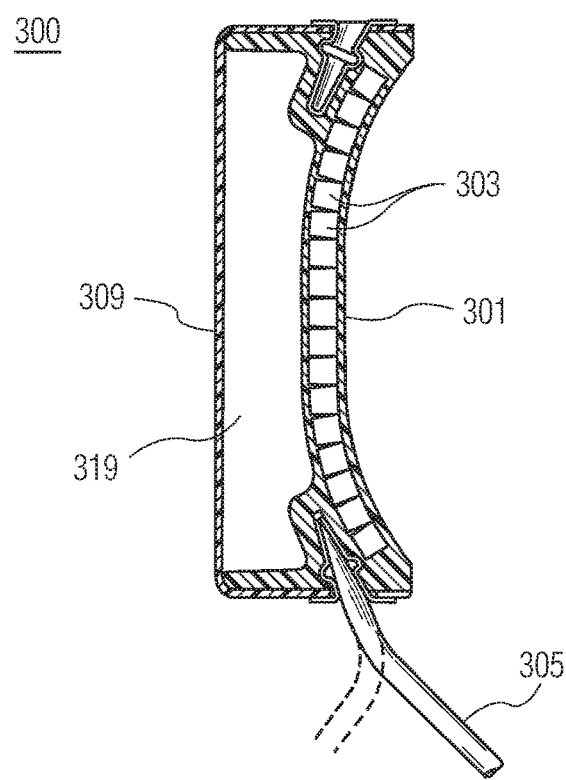
FIG. 3 shows one cross section of a Claymore type mine matrix 300 having fragments 303 permanently affixed thereto.

FIG. 2 shows a Claymore type mine. It may have folding legs 203, and has a curved front wall 301 held in a case 209. It may be initiated by a blasting cap 205 plugged into a well 207. There may be sights 211 and 213 to aim in positioning. FIG. 3 shows a partial side view (300) of a Claymore type mine. It is noted that the front wall 201 is curved, and it is lined with fragments 303. Also, there is a high explosive 319 within the case 309. The front wall and case may be made of a sturdy plastic based material, whereas fragments used in this invention may be tungsten cubes, e.g. Folding legs 203, 305 may be metal. Initiation of the explosive causes a detonation aimed at a target which might be a soldier or light vehicle. Fabricating the Claymore type mine under discussion requires production of a curved shape Claymore type body 106 (see FIG. 1) and to which are affixed tungsten cubes 105 as fragments. Positioning and maintaining the location of these multiple cubes is a great challenge, which is solved by this invention.

What is claimed is:

1. Method of permanently affixing fragments (105) upon a fragmentation warhead in a convex Claymore matrix (106) having a plastic case and a housing, comprising the steps of:
cutting out two (2) pieces of predetermined width and length from a structural film adhesive (104) at temperature 60° F.±5° F.; then,
positioning and pressing said film adhesive pieces into the plastic case at temperature 70° F.±2° F.; then,
pouring fragments into the case, at temperature 70° F.±2° F.; then,
arranging said fragments into the desired pattern while in the case, at temperature 70° F.±2° F.; then,
pressing the film adhesive pieces into the patterned fragments, at temperature 70° F.±2° F.; then,
pressing a piece of sheet metal (103) into the film adhesive pieces, at temperature 70° F.±2° F.; then,
placing an interface plate (102) and 5 lb of weight (101) onto the top of said sheet metal; then,
placing all the above assembled items in an oven at temperatures of 205° F.±5° F., for four hours, for full cure of the said adhesive pieces in the said Claymore matrix; and,
whereupon said fragments have therefore been permanently attached to said Claymore matrix exactly in a desired pattern, and without deforming or degrading of the Claymore matrix housing.

2. The method of claim 1 wherein the fragments are tungsten.

3. The method of claim 1 wherein the fragments are steel.

4. The method of claim 1 wherein the fragments are shaped as balls.

5. The method of claim 1 wherein the fragments are shaped as cubes.

6. The method of claim 1 wherein the fragments are a combination of balls and cubes.

7. The method of claim 1 wherein the structural film adhesive is AF 163-2M with 0.060 WT (weight), color RED.

8. Method of permanently affixing tungsten cube fragments to a fragmentation warhead in a convex Claymore matrix having a plastic case and a housing, comprising the steps of:
cutting out two (2) pieces of predetermined width and length of 0.060 WT (weight), AF 163-2M structural film adhesive, at temperature 60° F.±5° F.; then,
positioning and pressing said film adhesive pieces into the plastic case at temperature 70° F.±2° F.; then,
pouring tungsten cubes into the case; at temperature 70° F.±2° F.; then,
arranging said cubes into the desired pattern while in the case, at temperature 70° F.±2° F.; then,
pressing the film adhesive pieces into the patterned cubes, at temperature 70° F.±2° F.; then, pressing a piece of sheet metal into the film adhesive pieces, at temperature 70° F.±2° F.; then, placing an interface plate and 5 lb of weight onto the top of said sheet metal; then, placing all the above assembled items in an oven at temperatures of 205° F.±5° F., for four hours, for full cure of the said adhesive pieces in the said Claymore matrix; and, whereupon said tungsten cubes have therefore been permanently attached to said Claymore matrix exactly in a desired pattern, and without deforming or degrading of the Claymore matrix housing.

9. The method of claim 1 wherein the quantity of fragments is 700.

* * * * *